(12) United States Patent
Morgan

(10) Patent No.: US 9,845,263 B2
(45) Date of Patent: Dec. 19, 2017

(54) APPARATUSES FOR HOLDING AND RETAINING GLASS ARTICLES

(71) Applicant: Corning Incorporated, Corning, NY (US)

(72) Inventor: Kenneth Spencer Morgan, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 124 days.

(21) Appl. No.: 14/808,734

(22) Filed: Jul. 24, 2015

(65) Prior Publication Data

US 2016/0214888 A1 Jul. 28, 2016

Related U.S. Application Data

(60) Provisional application No. 62/106,969, filed on Jan. 23, 2015.

(51) Int. Cl.
*C03C 21/00* (2006.01)
*B08B 9/42* (2006.01)
(Continued)

(52) U.S. Cl.
CPC .............. *C03C 21/002* (2013.01); *B08B 9/42* (2013.01); *B08B 9/423* (2013.01);
(Continued)

(58) Field of Classification Search
CPC .......... A47F 7/0007; A47F 7/28; A47F 7/281; A47B 73/00; A47B 73/002; A47B 73/006;
(Continued)

(56) References Cited

U.S. PATENT DOCUMENTS 355,997 A * 1/1887 Joyce ..................... A47B 88/20
211/14
390,735 A 10/1888 Wieland
(Continued)

FOREIGN PATENT DOCUMENTS

CN 201641040 U 11/2010
CN 202642183 U 1/2013
(Continued)

OTHER PUBLICATIONS

International Search Report & Written Opinion dated Aug. 30, 2016 for PCT/US2016/031647 filed May 10, 2016. pp. 1-12.
(Continued)

*Primary Examiner* — Ko Hung Chan
(74) *Attorney, Agent, or Firm* — Dinsmore & Shohl LLP

(57) ABSTRACT

According to one or more embodiments described herein, an apparatus may hold and retain glass articles during processing. The apparatus may comprise a base frame comprising a bottom support plate and a plurality of ware keepers positioned on the bottom support plate. Each ware keeper of the plurality of ware keepers may comprise a plurality of retention bodies formed from wire segments and defining a ware receiving volume therebetween. Each retention body may comprise one or more of a base connection stem, a seat segment, a body segment, a retention segment, and a lever segment. The seat segments of the retention bodies may form a ware seat positioned above and substantially parallel to the bottom support plate. According to another embodiment, an assembly may comprise a plurality of magazine apparatus.

20 Claims, 8 Drawing Sheets

(51) Int. Cl.
  *C03C 23/00* (2006.01)
  *B65D 21/02* (2006.01)
  *B65D 71/52* (2006.01)
  *B65D 71/54* (2006.01)
  *B65D 71/06* (2006.01)

(52) U.S. Cl.
  CPC ..... *B65D 21/0212* (2013.01); *B65D 71/0003* (2013.01); *B65D 71/0007* (2013.01); *B65D 71/06* (2013.01); *C03C 23/0075* (2013.01)

(58) Field of Classification Search
  CPC . A47B 73/008; C03C 21/002; C03C 23/0075; B08B 9/423; B08B 9/42; B65D 21/0212; B65D 71/0003; B65D 71/06; B65D 71/0007
  USPC .......................................................... 211/74
  See application file for complete search history.

(56) References Cited

U.S. PATENT DOCUMENTS

| | | | |
|---|---|---|---|
| 431,862 A | 7/1890 | Abrams | |
| 463,604 A * | 11/1891 | Iske | A47G 19/28 211/14 |
| 492,143 A * | 2/1893 | Corley | F16M 13/00 248/153 |
| 659,328 A | 10/1900 | Strauss | |
| 664,475 A | 12/1900 | Graves | |
| 827,649 A | 7/1906 | Murphy | |
| 837,224 A | 11/1906 | Holcomb | |
| 898,007 A * | 9/1908 | Rowe | A47B 88/90 211/14 |
| 1,079,789 A | 11/1913 | Merker | |
| 1,117,824 A | 11/1914 | Fleming | |
| 1,264,677 A | 4/1918 | Murrell | |
| 1,704,472 A | 3/1929 | Grandjean | |
| 1,744,054 A * | 1/1930 | Mosgrove | A47G 23/025 211/74 |
| 1,798,779 A | 3/1931 | Bowersock | |
| 1,800,713 A | 4/1931 | Bowersock | |
| 1,828,837 A | 10/1931 | Gagen | |
| 1,980,930 A | 11/1934 | Reyniers | |
| 2,013,240 A | 9/1935 | Harvey | |
| 2,151,192 A | 3/1939 | Crosser | |
| 2,191,488 A | 2/1940 | McCowan | |
| 2,206,686 A | 7/1940 | Bauman | |
| 2,256,663 A | 9/1941 | Brewer | |
| 2,269,940 A | 1/1942 | Johnson | |
| 2,334,839 A | 11/1943 | Purchas | |
| 2,520,818 A | 8/1950 | Terry | |
| 2,545,416 A | 3/1951 | Staaf | |
| 2,615,749 A | 10/1952 | Kuchel | |
| 2,760,647 A | 8/1956 | Saul, Jr. | |
| 2,802,649 A | 8/1957 | Stockton | |
| 2,805,777 A | 9/1957 | Larson | |
| 2,916,156 A | 12/1959 | Larson | |
| 2,956,686 A * | 10/1960 | Garey | B01L 9/06 211/74 |
| 2,979,246 A | 4/1961 | Liebeskind | |
| 3,187,902 A | 6/1965 | Nelson | |
| 3,370,696 A | 2/1968 | Groe | |
| 3,590,752 A | 7/1971 | De Pew | |
| 3,590,863 A | 7/1971 | Faust et al. | |
| 3,613,897 A | 10/1971 | Filler | |
| 3,765,635 A | 10/1973 | Burrell et al. | |
| 3,768,709 A * | 10/1973 | Kinard | A63B 47/001 224/248 |
| 3,780,972 A | 12/1973 | Brodersen | |
| 3,837,477 A | 9/1974 | Boudreau | |
| 4,040,234 A | 8/1977 | Stockdale et al. | |
| 4,068,798 A | 1/1978 | Rohde | |
| 4,182,455 A | 1/1980 | Zurawin | |
| 4,241,546 A | 12/1980 | Ilk | |
| 4,284,603 A | 8/1981 | Korom | |
| 4,285,449 A | 8/1981 | Campos | |
| 4,350,253 A | 9/1982 | Rusteberg | |
| 4,485,929 A | 12/1984 | Betts, Sr. | |
| 4,498,594 A | 2/1985 | Elder | |
| 4,534,465 A | 8/1985 | Rothermel et al. | |
| 4,583,647 A | 4/1986 | Schinzing | |
| 4,681,233 A | 7/1987 | Roth | |
| 4,793,548 A | 12/1988 | Ross | |
| 4,871,074 A | 10/1989 | Bryson et al. | |
| 5,036,989 A | 8/1991 | Carilli | |
| 5,148,919 A | 9/1992 | Rubin | |
| 5,169,603 A | 12/1992 | Landsberger | |
| 5,279,428 A | 1/1994 | Lee | |
| 5,346,063 A | 9/1994 | Chow | |
| 5,360,309 A | 11/1994 | Ishiguro | |
| 5,375,716 A | 12/1994 | Rubin et al. | |
| 5,384,103 A | 1/1995 | Miller | |
| 5,451,380 A | 9/1995 | Zinnanti | |
| 5,492,671 A | 2/1996 | Krafft | |
| 5,505,316 A | 4/1996 | Lee | |
| 5,544,747 A | 8/1996 | Horn | |
| 5,558,246 A * | 9/1996 | Ross, Jr. | A47F 7/28 220/4.22 |
| 5,570,863 A | 11/1996 | Cooper | |
| 5,624,032 A | 4/1997 | Yucknut et al. | |
| 5,785,239 A | 7/1998 | Campbell, II et al. | |
| 5,797,675 A | 8/1998 | Tanner, Jr. | |
| 5,843,388 A | 12/1998 | Arroyo et al. | |
| 5,888,830 A | 3/1999 | Mohan et al. | |
| 5,893,457 A | 4/1999 | Wei | |
| 5,918,751 A * | 7/1999 | Kelly | A47F 7/28 206/511 |
| 5,967,340 A | 10/1999 | Kao | |
| 5,984,293 A | 11/1999 | Abrahamson et al. | |
| 5,988,382 A | 11/1999 | Ritchie et al. | |
| 6,113,202 A | 9/2000 | Germano | |
| 6,132,684 A | 10/2000 | Marino | |
| 6,193,064 B1 | 2/2001 | Finneran | |
| 6,193,081 B1 | 2/2001 | Ewing | |
| 6,227,370 B1 | 5/2001 | Earnshaw et al. | |
| 6,230,888 B1 | 5/2001 | Frieze et al. | |
| 6,244,447 B1 | 6/2001 | Frieze et al. | |
| 6,257,409 B1 | 7/2001 | Lin | |
| 6,274,092 B1 * | 8/2001 | Itoh | B01L 9/06 206/443 |
| 6,279,760 B1 | 8/2001 | Broeski | |
| 6,290,680 B1 | 9/2001 | Forsberg et al. | |
| 6,299,000 B1 | 10/2001 | Cabrera | |
| 6,343,690 B1 * | 2/2002 | Britton | B65G 17/002 198/803.6 |
| 6,345,723 B1 | 2/2002 | Blake et al. | |
| 6,354,543 B1 | 3/2002 | Paske | |
| 6,382,685 B1 | 5/2002 | Hammond | |
| 6,443,316 B1 | 9/2002 | Mao | |
| 6,481,583 B1 | 11/2002 | Black et al. | |
| 6,533,133 B2 | 3/2003 | Liu | |
| 6,568,544 B1 | 5/2003 | Lafond et al. | |
| 6,575,311 B1 | 6/2003 | Fink | |
| 6,832,685 B2 | 12/2004 | Chang | |
| 6,971,506 B2 * | 12/2005 | Hassinen | G01N 35/04 198/803.14 |
| 7,152,837 B1 | 12/2006 | Babjak | |
| 7,213,592 B2 | 5/2007 | Fischhaber et al. | |
| 8,148,169 B2 | 4/2012 | Gjerde et al. | |
| 8,230,997 B1 | 7/2012 | McWilliams et al. | |
| 8,875,885 B2 | 11/2014 | Padden et al. | |
| 8,955,697 B2 | 2/2015 | Spilotro | |
| 9,403,270 B2 | 8/2016 | Lin | |
| 2002/0070185 A1 | 6/2002 | Chen | |
| 2002/0108917 A1 * | 8/2002 | Maruyama | B01L 9/06 211/74 |
| 2004/0140277 A1 | 7/2004 | Comartin et al. | |
| 2005/0207945 A1 * | 9/2005 | Itoh | G01N 35/04 422/562 |
| 2006/0027586 A1 | 2/2006 | Longhany et al. | |
| 2006/0198765 A1 | 9/2006 | Gjerde et al. | |
| 2007/0094924 A1 | 5/2007 | Wingerden | |
| 2008/0185352 A1 | 8/2008 | O'Hara | |

(56) References Cited

U.S. PATENT DOCUMENTS

| | | |
|---|---|---|
| 2010/0089938 A1 | 4/2010 | Motadel |
| 2010/0163502 A1 | 7/2010 | Chang |
| 2010/0258515 A1 | 10/2010 | Chen |
| 2011/0084039 A1 | 4/2011 | Walters et al. |
| 2011/0113974 A1 | 5/2011 | D'Amato et al. |
| 2011/0132853 A1 | 6/2011 | Drobot et al. |
| 2011/0200500 A1 | 8/2011 | Feilders et al. |
| 2011/0240577 A1 | 10/2011 | Jones et al. |
| 2011/0293942 A1 | 12/2011 | Cornejo et al. |
| 2012/0037529 A1 | 2/2012 | Hall |
| 2012/0051987 A1 | 3/2012 | Johnson et al. |
| 2012/0085720 A1 | 4/2012 | Bettenhausen et al. |
| 2012/0292273 A1 | 11/2012 | Mcnamara |
| 2012/0305507 A1 | 12/2012 | Herchenbach et al. |
| 2013/0171456 A1 | 7/2013 | Fadeev et al. |
| 2013/0219965 A1 | 8/2013 | Allan et al. |
| 2013/0277322 A1 | 10/2013 | Tiberio |
| 2014/0093438 A1* | 4/2014 | Yanez ............... B01L 9/06 422/561 |
| 2014/0112845 A1 | 4/2014 | Edens et al. |
| 2014/0166520 A1 | 6/2014 | Hoppe et al. |
| 2014/0239022 A1* | 8/2014 | Dovell ............... A47F 7/283 224/148.4 |
| 2014/0305825 A1 | 10/2014 | Holley, Jr. |
| 2014/0332428 A1 | 11/2014 | Holley, Jr. |
| 2014/0332429 A1 | 11/2014 | Boersma et al. |
| 2015/0001116 A1 | 1/2015 | Schmal et al. |
| 2015/0210457 A1 | 7/2015 | Dimauro |
| 2015/0246761 A1 | 9/2015 | Holley, Jr. et al. |
| 2016/0052125 A1 | 2/2016 | Steele et al. |
| 2016/0167041 A1 | 6/2016 | Curry et al. |

FOREIGN PATENT DOCUMENTS

| | | |
|---|---|---|
| DE | 2255316 A1 | 5/1974 |
| DE | 2618522 A1 | 11/1977 |
| GB | 617777 A | 2/1949 |
| GB | 736837 A | 9/1955 |
| GB | 940041 A | 10/1963 |
| KR | 101101122 B1 | 12/2011 |

OTHER PUBLICATIONS

Notice of Allowance dated Sep. 14, 2016 for U.S. Appl. No. 14/808,728, filed Jul. 24, 2015. pp. 1-13.

International Search Report & Written Opinion dated Oct. 29, 2015 for PCT/US2015/042012 filed Jul. 24, 2015. pp. 1-9.

International Search Report & Written Opinion dated Oct. 23, 2015 for PCT/US2015/042016 filed Jul. 24, 2015. pp. 1-9.

International Search Report & Written Opinion dated Nov. 2, 2015 for PCT/US2015/042033 filed Jul. 24, 2015. pp. 1-9.

International Search Report & Written Opinion dated Oct. 29, 2015 for PCT/US2015/042007 filed Jul. 24, 2015. pp. 1-9.

Non-Final Office Action dated Mar. 13, 2017, for U.S. Appl. No. 14/808,702, filed Jul. 24, 2015. pp. 1-10.

Non-Final Office Action dated Mar. 28, 2017, for U.S. Appl. No. 14/808,710, filed Jul. 24, 2015. pp. 1-10.

* cited by examiner

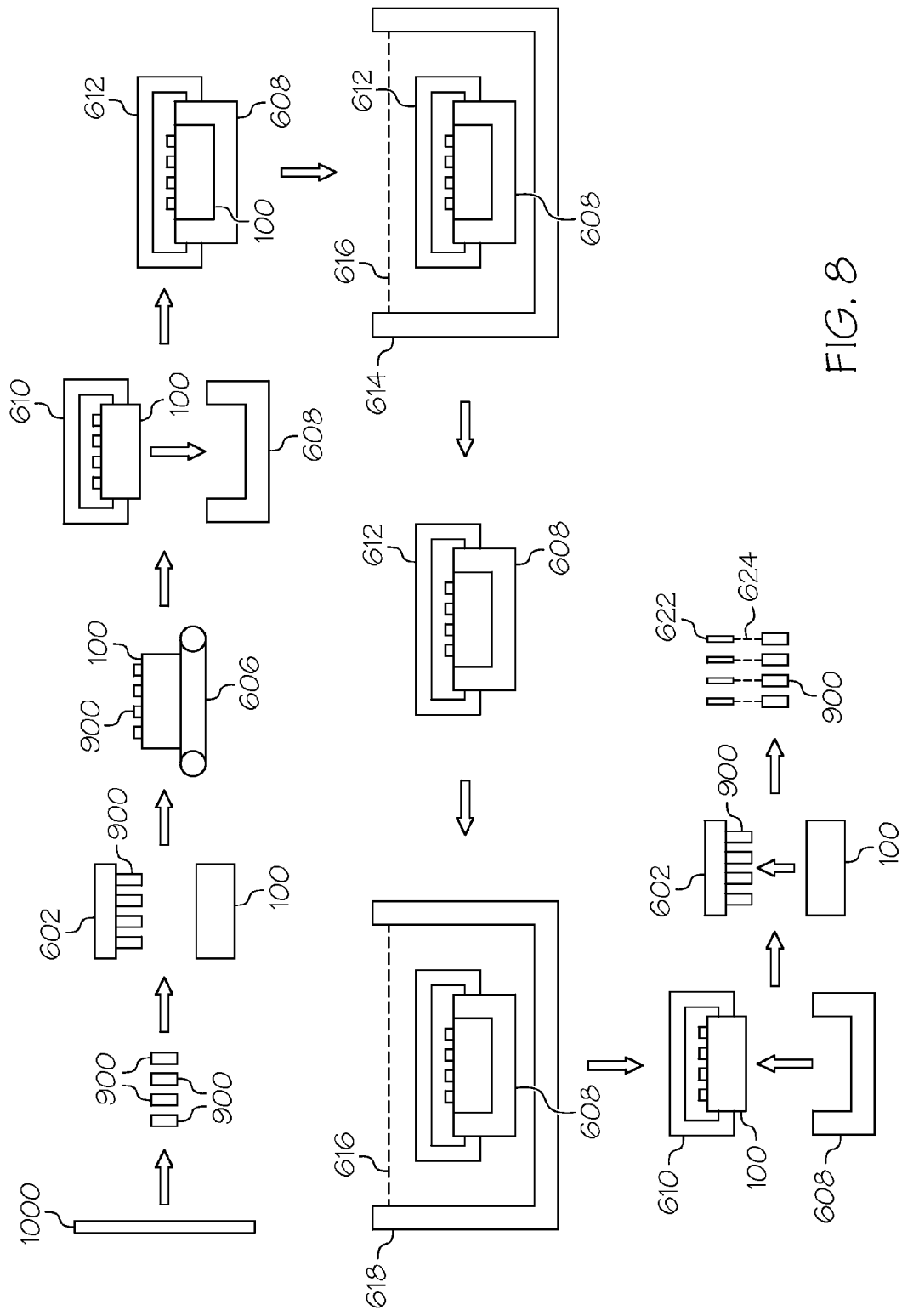

APPARATUSES FOR HOLDING AND RETAINING GLASS ARTICLES

CROSS REFERENCE TO RELATED APPLICATIONS

The present application claims priority to U.S. Provisional Patent Application No. 62/106,969 filed Jan. 23, 2015 and entitled, "Apparatuses for Holding and Retaining Glass Articles," the entirety of which is incorporated by reference herein.

BACKGROUND

Field

The present specification generally relates to magazine apparatuses for holding glass articles during processing and, more specifically, to magazine apparatuses for holding glass articles during ion-exchange processing.

Technical Background

Historically, glass has been used as a preferred material for many applications, including food and beverage packaging, pharmaceutical packaging, kitchen and laboratory glassware, and windows or other architectural features, because of its hermeticity, optical clarity and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent pieces of glassware and contact between the glass and equipment, such as handling and/or filling equipment. Regardless of the source, the presence of these flaws may ultimately lead to glass breakage.

Accordingly, a need exists for alternative apparatuses for holding glass articles during processing to mitigate glass breakage.

SUMMARY

According to one embodiment, an apparatus may hold and retain glass articles during processing. The apparatus may comprise a base frame comprising a bottom support plate and a plurality of ware keepers positioned on the bottom support plate. Each ware keeper of the plurality of ware keepers may comprise a plurality of retention bodies formed from wire segments and defining a ware receiving volume therebetween. Each retention body may comprise one or more of a base connection stem engaged with the bottom support plate, a seat segment contiguous with the base connection stem and positioned over and substantially parallel to the bottom support plate, a body segment coupled to the seat segment and extending away from the bottom support plate, a retention segment coupled to the body segment, and a lever segment coupled to the retention segment. The seat segments of the retention bodies may form a ware seat positioned above and substantially parallel to the bottom support plate.

In another embodiment, an assembly may hold and retain glass articles. The assembly may comprise a plurality of magazine apparatus. Each of the magazine apparatus may comprise a base frame comprising a bottom support plate and a plurality of ware keepers positioned on the bottom support plate. Each ware keeper of the plurality of ware keepers may comprise a plurality of retention bodies formed from wire segments and defining a ware receiving volume therebetween. Each retention body may comprise a base connection stem engaged with the bottom support plate, a seat segment contiguous with the base connection stem and positioned over and substantially parallel to the bottom support plate, a body segment coupled to the seat segment and extending away from the bottom support plate, a retention segment coupled to the body segment, and a lever segment coupled to the retention segment. The seat segments of the retention bodies may form a ware seat positioned above and substantially parallel to the bottom support plate.

Additional features and advantages of the apparatuses for holding and retaining glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 8 schematically depicts the method steps of the flow diagram of FIG. 7, according to one or more embodiments shown and described herein.

DETAILED DESCRIPTION

Figure 1:
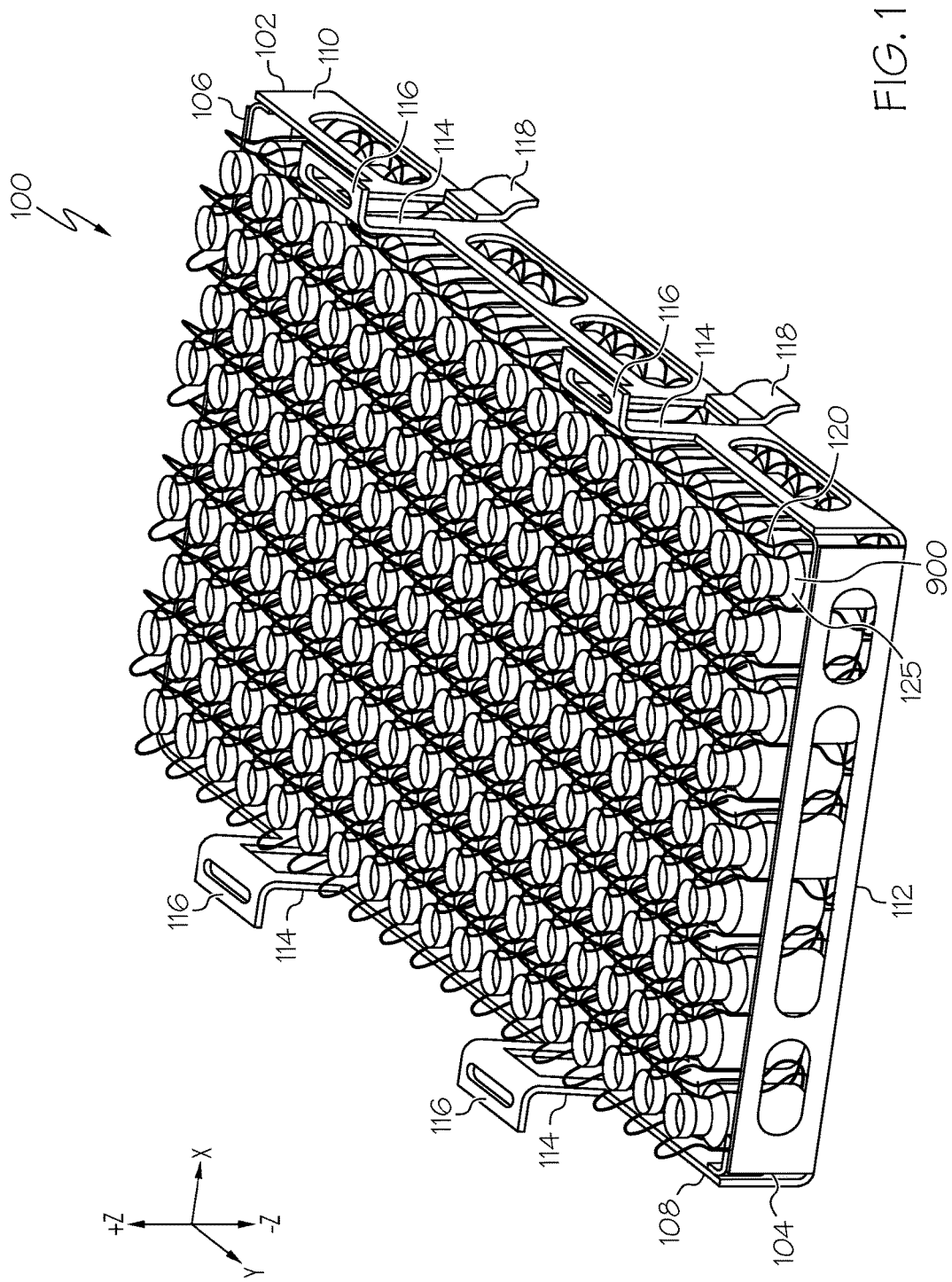
FIG. 1 schematically depicts a perspective view of a magazine apparatus loaded with glass articles, according to one or more embodiments shown and described herein.

Reference will now be made in detail to embodiments of magazine apparatuses for holding and retaining glass articles during processing, examples of which are illustrated in the accompanying drawings. Whenever possible, the same reference numerals will be used throughout the drawings to refer to the same or like parts. One embodiment of an apparatus for holding and retaining glass articles during processing is schematically depicted in FIG. 1. The magazine apparatus generally comprises a base frame comprising a bottom support plate and a plurality of ware keepers positioned on the bottom support plate. Each ware keeper of the plurality of ware keepers may comprise a plurality of retention bodies formed from wire segments and defining a ware receiving volume therebetween. In some embodiments, each retention body may comprise one or more of a base connection stem engaged with the bottom support plate, a seat segment contiguous with the base connection stem and positioned over and substantially parallel to the bottom support plate, a body segment coupled to the seat segment and extending away from the bottom support plate, a retention segment coupled to the body segment, and/or a lever segment coupled to the retention segment. The seat segments of the retention bodies may form a ware seat positioned above and substantially parallel to the bottom support plate.

Various embodiments of apparatuses for holding and retaining glass articles during processing will be described in further detail herein with specific reference to the appended drawings.

As noted herein, the breakage of glass articles during processing and/or filling is a source of product loss and may lead to process inefficiencies and increased costs. Strengthening of glass articles can assist in mitigating breakage. Glass articles can be strengthened using a variety of techniques, including chemical and thermal tempering. For example, chemical tempering can be used to strengthen glass articles through the introduction of a layer of compressive stress in the surface of the glass articles. The compressive stress is introduced by submerging the glass articles in a molten salt bath. As ions from the glass are replaced by relatively larger ions from the molten salt, a compressive stress is induced in the surface of the glass. During chemical tempering, glass articles, such as glass containers, may be mechanically manipulated to both fill and empty the glass articles of molten salt.

While chemical tempering improves the strength of the glass articles, mechanical manipulation of the glass articles during the strengthening process may introduce flaws in the surface of the glass. For example, contact between the glass articles and the fixturing used to retain the glass articles during processing may introduce flaws in the glass, particularly when the glass articles and the fixturing are initially submerged in the molten salt bath and/or when the fixturing and glass articles are withdrawn from the molten salt bath and rotated to empty the glass articles of molten salt. Specifically, as the glass articles are submerged it may be buoyant and thus be propelled upward relative to the fixturing. Moreover, after the ion-exchange process is complete, the fixturing and glassware are withdrawn from the molten salt bath and the fixturing is rotated to empty the glassware of molten salt contained within the interior volume of the glassware. As the fixturing is rotated, the glassware may abruptly collide with the fixturing. This blunt force impact between the glassware and the fixturing may introduce flaws in the surface of the glass.

In most cases the flaws are superficial and are contained within the layer of surface compressive stress induced in the glass. This surface compressive stress prevents the flaws from growing into cracks. However, in extreme cases, the flaws may extend through the layer of surface compressive stress which may lead to breakage of the glass articles.

In addition, fixturing used to hold and retain glass articles during ion-exchange processing is typically formed from metallic materials in order to be able to withstand the high temperatures of the molten salt bath. Such fixturing can have a large thermal mass which can adversely impact the ion-exchange process by altering the temperature of the molten salt bath. The fixturing also tends to have a large surface area which increases the contact between the fixturing and the molten salt which can cause the ions from the molten salt to diffuse into the fixturing, degrading process performance.

The magazine apparatuses for holding and retaining glass articles during processing described herein mitigate the introduction of flaws in the glass articles retained therein. The magazine apparatuses described herein also have a relatively low thermal mass and surface area which mitigates the degradation of ion-exchange performance when the magazine apparatuses are used to facilitate strengthening of the glass articles contained therein by ion-exchange.

Referring now to FIG. 1, one embodiment of a magazine apparatus 100 for holding and retaining glass articles 900 during processing is schematically depicted. The magazine apparatus 100 generally includes a base frame 102 to which a plurality of ware keepers 120 are affixed. The ware keepers 120 generally define a ware receiving volume 125 in which a glass article 900, such as a glass container, may be received and retained during processing. The base frame 102 is generally formed from a material capable of withstanding elevated temperatures, such as the temperatures experienced in a molten salt bath during an ion-exchange process. In the embodiments described herein, the base frame 102 is formed from a metallic material, such as stainless steel or other like metal or metal alloy that is resistant to corrosion when contacted by a salt bath.

The base frame 102 generally includes a bottom support plate 112 and may also include side members 104, 106, 108, 110. The bottom support plate 112 may be tray shaped (such as generally rectangular as shown in FIG. 1) and support the plurality of ware keepers 120 which extend from a top surface of the bottom support plate 112. The side members 104, 106, 108, 110 may be located on edges of the base frame 102. For example, for a rectangular shaped bottom support plate 112, as shown in FIG. 1, side members 104 and 106 are opposite one another in a length direction (i.e., the +/−Y direction of the coordinate axes depicted in FIG. 1) and side members 108, 110 are opposite one another in a width direction (i.e., the +/−X direction of the coordinate axes depicted in FIG. 1). The side members 104, 106, 108, 110 generally extend above the bottom support plate 112. For example, in some embodiments, the side members 104, 106, 108, 110 may be generally perpendicular to the bottom support plate 112. However, it should be understood that the side members 104, 106, 108, 110 need not be perpendicular to the bottom support plate 112. For example, the side members 104, 106, 108, 110 may be at an angle of less than or greater than 90 degrees with respect to the bottom support plate 112 so long as the side members 104, 106, 108, 110 generally extend above the bottom support plate 112 (i.e., the +Z direction of the coordinate axes depicted in FIG. 1). The side members 104, 106, 108, 110 may be integrally formed with the bottom support plate 112 or attached to the bottom support plate 112 using conventional fastening techniques including, without limitation, mechanical fasteners, welding, or the like.

Figure 2:
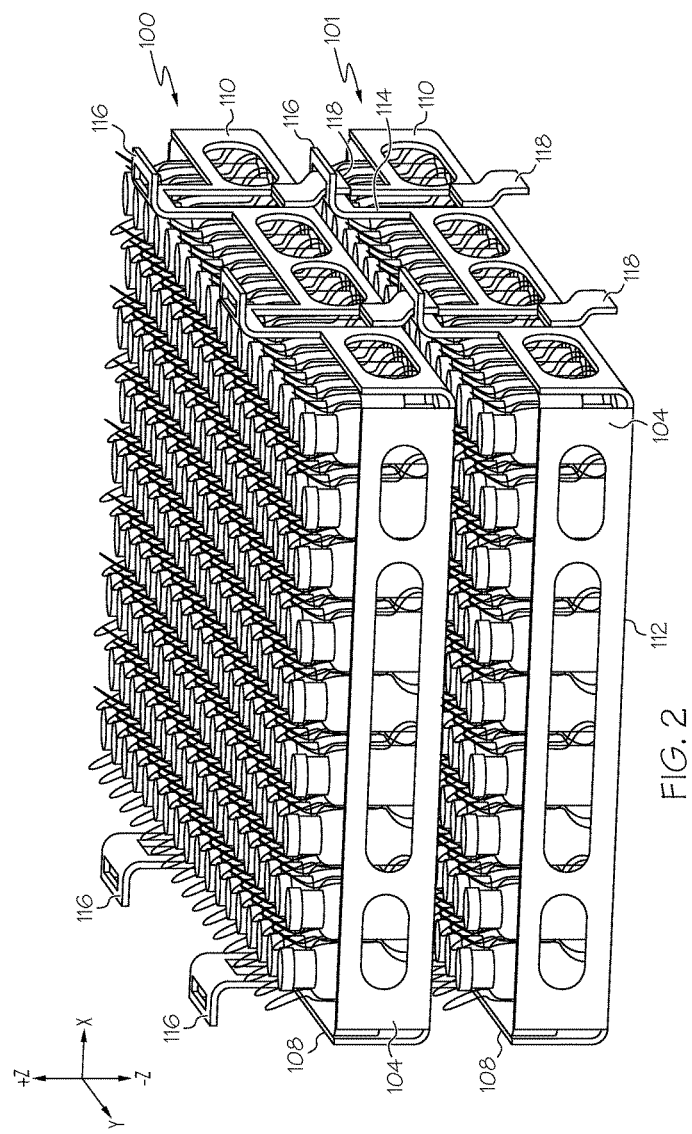
FIG. 2 schematically depicts a perspective view of stacked magazine apparatuses loaded with glass articles, according to one or more embodiments shown and described herein.

Now referring to FIGS. 1 and 2, in the embodiments described herein, one or more of the side members 104, 106, 108, 110 may have stacking components 114 which allow two or more magazine apparatuses 100 to be stacked upon one another. For example, in FIGS. 1 and 2, stacking components 114 protrude from the top and bottom of side members 108, 110. The stacking components 114 may each comprise a receiving member 116 and a tab 118. In the embodiment shown if FIGS. 1 and 2, the tabs 118 protrude from the lower portion of the side members 108, 110 and receiving members 116 protrude from the upper portion of the side members 108 and 110. The tabs 118 of a first magazine apparatus 100 may be inserted into receiving members 116 of a second magazine apparatus 101. For example, the tabs 118 protrude into the −Z direction and are received by a receiving member 116 of a lower magazine apparatus 100, where the receiving member protrudes in the +Z direction relative to the lower magazine apparatus 100. The tabs 118 and receiving members 116 may be cooperatively arranged to provide for supported stacking of two or more magazine apparatuses 100, 101. In such a stacked configuration, the two magazine apparatuses 100 may be separated by an open space, such that the tops of the ware keepers 120 of a lower magazine apparatus 101 do not come into contact with the bottom support plate 112 of an upper magazine apparatus 100.

The side members 104, 106, 108, 110 may allow for the free flow of processing liquids, such as molten salt from an ion-exchange bath, into direct contact with the glass article 900 secured in the magazine apparatus 100. For example, the side members 104, 106, 108, 110 may have a height less than the height of the glass articles 900 or apertures may be present in the side members 104, 106, 108, 110.

Figure 3:
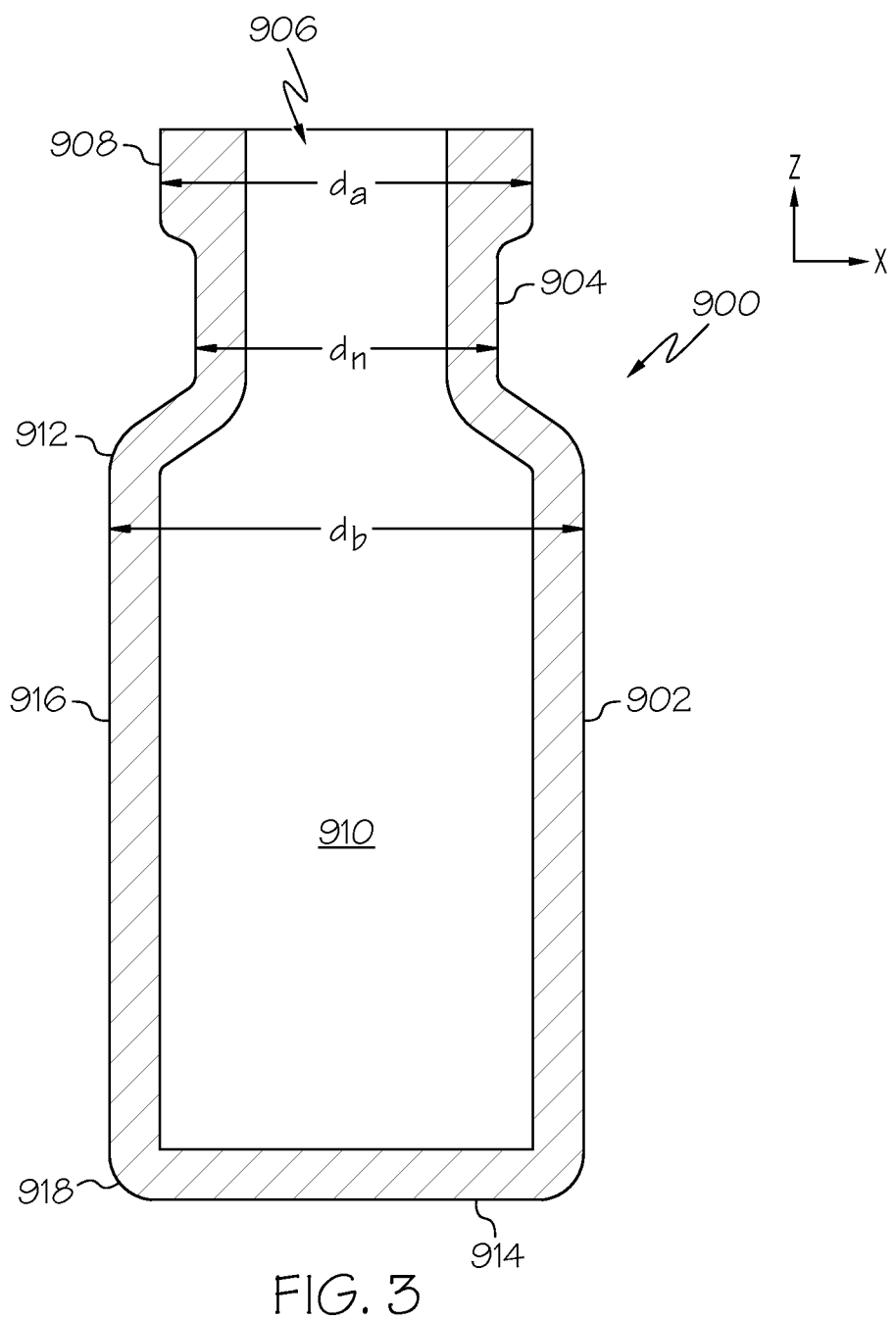
FIG. 3 schematically depicts a cross-sectional view of a glass article, according to one or more embodiments shown and described herein.

In one embodiment, each ware keeper 120 may be shaped and sized to securely retain glass articles 900 shaped as vials. In such an embodiment, as shown in FIG. 3, the glass articles 900 may generally include a body section 902, a neck section 904 above the body section 902, and an opening 906. The body section 902 substantially surrounds an interior volume 910 of the glass articles 900 with a bottom section 914 and side walls 916. The neck section 904 generally connects the body section 902 with the opening 906. The opening 906 may be surrounded by a collar 908. The body section 902 may have a curved bottom edge 918 and a curved area 912 adjacent the neck section 904. Generally, the neck section 904, body section 902, and collar 908 may have a generally circular shaped cross section, each comprising an exterior diameter. In one embodiment, the diameter of the collar ($d_a$) is greater than the diameter of the neck section ($d_n$) and the diameter of the body section ($d_b$) is greater than the diameter of the collar ($d_a$). While some embodiments of magazine apparatus described herein are suitable to retain vial shaped glass articles, it should be understood that other embodiments contemplated herein are suitable to retain glass articles, such as containers, with a wide variety of shapes.

Figure 4:
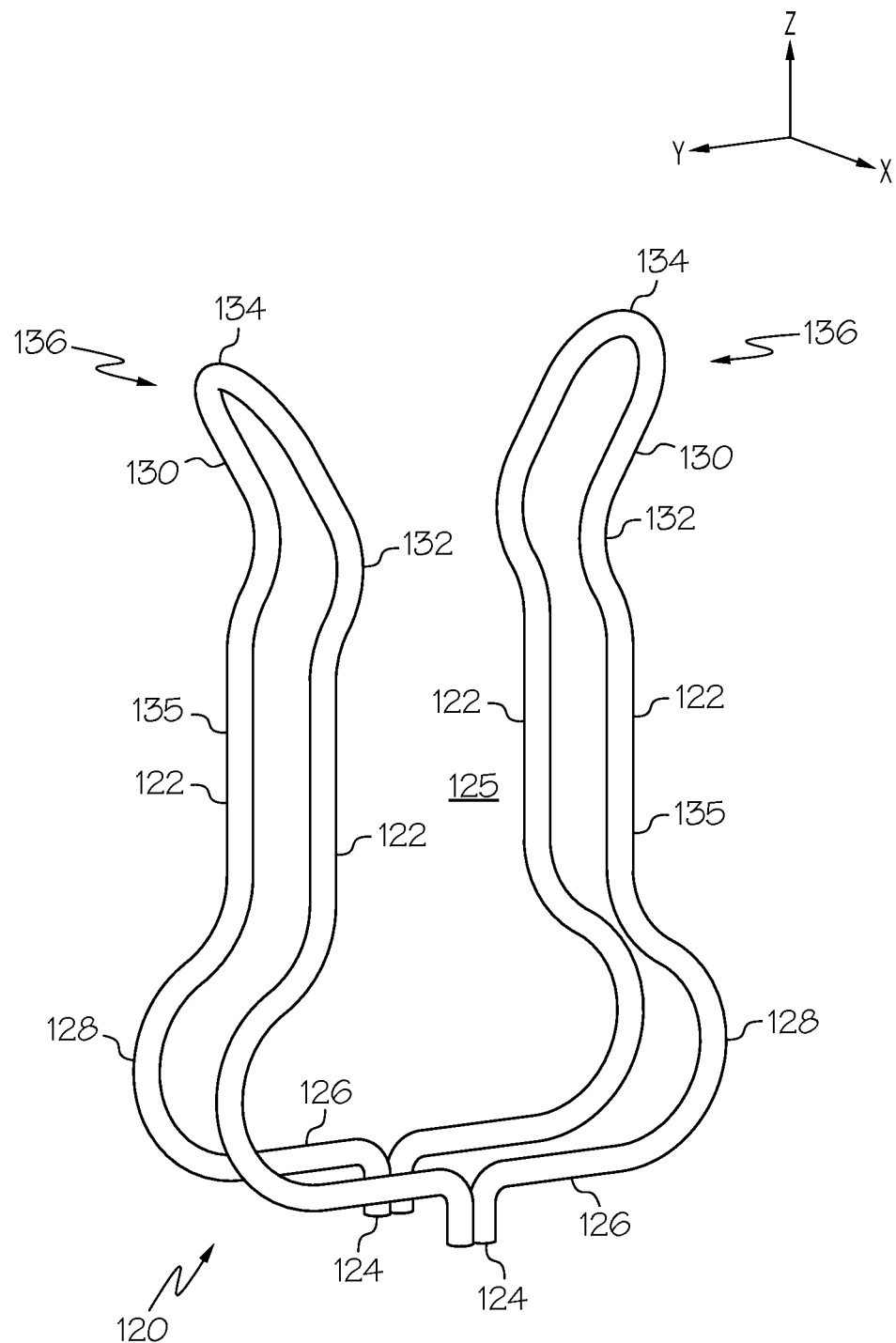
FIG. 4 schematically depicts a perspective view of a ware keeper in an unloaded state, according to one or more embodiments shown and described herein.
Figure 5:
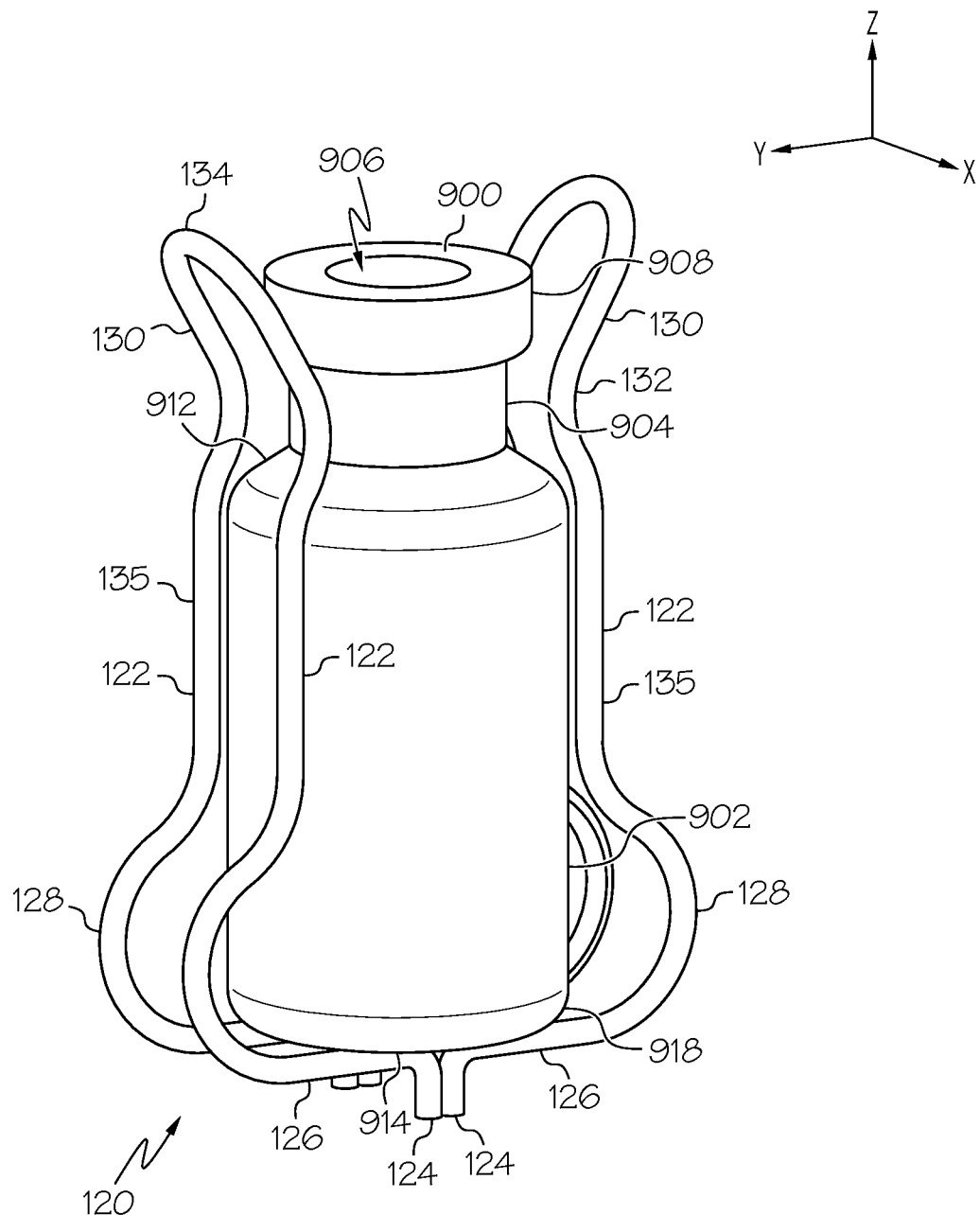
FIG. 5 schematically depicts a perspective view of a ware keeper in a loaded state, according to one or more embodiments shown and described herein.

Referring now to FIGS. 4 and 5, the ware keepers 120 each include retention bodies 122 which are positioned to define a ware receiving volume 125 in which a glass article 900 may be received. The retention bodies 122 are discrete, independent structures positioned on opposite sides of the ware receiving volume 125 such that the retention bodies 122 may be positioned on either side of a glass article 900 positioned in the ware receiving volume 125, thereby securing the glass article 900 in the ware receiving volume 125. In the embodiments described herein, the retention bodies 122 are formed from shaped wire segments. As used herein, "wire segment" is descriptive of the shape of the retention body 122, and is not limiting on the material of the wire segment. Forming the retention bodies 122 from wire segments reduces the overall amount of material in the magazine apparatus 100 which, in turn, reduces both the thermal mass and surface area of the magazine apparatus 100 thereby improving ion-exchange performance. In addition, forming the retention bodies 122 from one or more wire segments creates a basket-like, open structure which allows molten salt from a molten salt bath to readily interact with all surfaces of the glass article when the magazine apparatus 100 is submerged while also allowing the magazine apparatus 100 to be easily drained of molten salt upon extraction from the molten salt bath.

In the embodiments described herein, the retention bodies 122 are formed from wire stock which is free from corners and/or edges that can introduce flaws in glass. In particular, the retention bodies 122 are formed from wire stock which is substantially circular or oval in radial cross section. While various diameters of wire stock may be used to form the retention bodies 122, the diameter of the wire stock is generally less than about 5 mm, such as less than about 2.5 mm, less than about 2.0 mm, less than about 1.3 mm or even less than or equal to about 1 mm. In the embodiments described herein the ware keepers 120 are formed from wire stock which is suitable for use at elevated temperatures. For example, the ware keepers 120 may be formed from, without limitation Inconel, Hastelloy, and other related Nimonic alloys, various grades of high-temperature/corrosive environment compatible steel alloys, or other like materials which may be available in wire or thin strip form, are insensitive or exhibit limited sensitivity to a molten salt bath environment, and are capable of maintaining spring temper properties after repeated thermal cycles. In the embodiments described herein, the wire stock is formed into the desired shape using a computer-numeric-control (CNC) wire bending machine or a similar apparatus for forming wire stock into a desired shape. A similar geometry can be achieved through a process that includes stamping thin sheet stock and using forming dies to create a retention volume.

Generally, the retention bodies 122 are positioned to form the ware receiving volume 125 where a glass article 900 may be securely positioned during processing. In one embodiment, as shown in FIG. 4, each retention body 122 includes a base connection stem 124, a seat segment 126, a body segment 135, a retention segment 132, a lower segment 128, and a lever segment 130. Retention bodies 122 may be attached to other retention bodies 122 with a connecting segment 134, such as a looped wire segment. Two retention bodies 122 may be attached via a connecting segment 134, forming a retention body couplet 136.

As shown in FIGS. 4 and 5, retention bodies 122 are attached to one another to form retention body couplets 136.

In one embodiment, each ware keeper 120 comprises four retention bodies 122 arranged into two retention body couplets 136 where the retention body couplets 136 are linearly symmetric to one another. Connecting segments 134 secure the retention bodies 122 to one another, where in one embodiment, the two attached retention bodies 122 and the connecting segment 134 are integrally formed from a single wire segment. The retention body couplets 136 may be positioned on opposite sides of the ware receiving volume 125 where glass articles 900 may be held. It should be understood that the ware keepers 120 described herein are not limited to those comprising connected retention bodies 122. Additionally, in other embodiments, various numbers of retention bodies 122, attached or unattached to one another, may be utilized.

Now referring to FIGS. 3-5, the base connection stem 124 may be positioned proximate a bottom section 914 of a held glass article 900. The base connection stem 124 may support the other portions of the retention body 122 and may be affixed to the base frame 102 such that it is engaged with the bottom support plate 112. The base connection stem 124 generally may emanate from the bottom support plate 112, below the ware receiving volume 125. In one embodiment, the base connection stem 124 forms about a 90° with the bottom support plate 112.

The base connection stem 124 is attached to the seat segment 126. The seat segment 126 may be contiguous with the base connection stem 124 and be positioned over and substantially parallel to the bottom support plate 112. As such, the seat segment 126 may spaced apart from the bottom support plate 112. The seat segments 126 generally form a ware seat positioned above and substantially parallel to the bottom support plate 112. The ware seat may define the bottom of the ware receiving volume 125. The spacing between the bottom support base may be sufficient to allow for the flow of a fluid beneath a held glass article 900, such that the bottom section 914 of a glass article held in the ware receiving volume 125 can be contacted by the fluid. In one embodiment, the seat segments 126 of adjacent retention bodies 122 are parallel, such that they form a flat surface.

The seat segment 126 may be attached to a lower segment 128 of the retention body 122. The lower segment 128 may be shaped to form a protruded area in the ware receiving volume 125. The diameter of the ware receiving volume enclosed by the lower segment may be greater than the diameter of the ware receiving volume enclosed by the body segment. For example, the lower segment 128 may be convex shaped relative to the ware receiving volume 125. The lower segment 128 may be shaped such that it avoids contact with the bottom edge 918 of a glass article 900 held in the ware receiving volume 125. It may be desirable to avoid contact by the ware keepers 120 with the bottom edge 918 of the glass article 900 because scratches or other damage at the bottom edge 918, which can be caused by contact with the ware keepers 120 in that region, may be undesirable relative to other areas of the glass articles 900 because the bottom edge 918 of the glass article 900 can be an area of high stress when vertical pressure is applied to the glass article 900. However, in some embodiments, the seat segment 126 may be coupled directly to the body segment 135.

The lower segment 128 may be attached to a body segment 135 of the retention body 122. The body segment 135 may extend away from the bottom support plate 112 and, in one embodiment, may be substantially perpendicular to the bottom support plate 112. As shown in FIG. 5, the body segment 135 may be substantially straight and contoured with the side wall 916 of a glass article 900 held in the ware receiving volume 125. The body segment 135 may form the basket or cage like configuration which restrains the motion of the glass article 900 in the horizontal direction, defined by the direction of the X-Y plane.

The body segment 135 is attached to a retention segment 132 of the retention body 122. The retention segment 132 may generally be shaped to form a recessed area in the ware receiving volume 125. The diameter of the ware receiving volume enclosed by the retention segment 132 may be less than the diameter of the ware receiving volume enclosed by the body segment 135. For example, the recessed area may be recessed relative to a glass article 900 held in the ware receiving volume 125. The retention segment 132 may be concave shaped relative to the ware receiving volume 125. For example, the retention segment 132 may be contoured to the shape of a neck section 904 and curved area 912 at the top of the body section 902 of a held glass article 900. The distance between retention segments 132 of each retention body 122 may be greater than the diameter of the neck section 904 of the held glass article 900. As such, the glass articles 900 are secured by the ware keepers 120 in the ware receiving volume 125 such that the glass articles 900 are limited in vertical movement, defined by the direction of the Z-axis. For example, when a glass article 900 is turned upside down relative to its position in FIG. 5, the retention segment 132 will contact the curved area 912 of the body section 902 of a glass article 900 and be retained in the ware receiving volume 125.

The retention segment 132 may be coupled to a lever segment 130. The lever section may generally extend away from the bottom support plate 112 and the lever segments 130 of opposing retention bodies 122 may extend away from one another. Any two lever segments 130 may be connected by a connection segment 134 to form a retention body couplet 136.

Figure 6A:
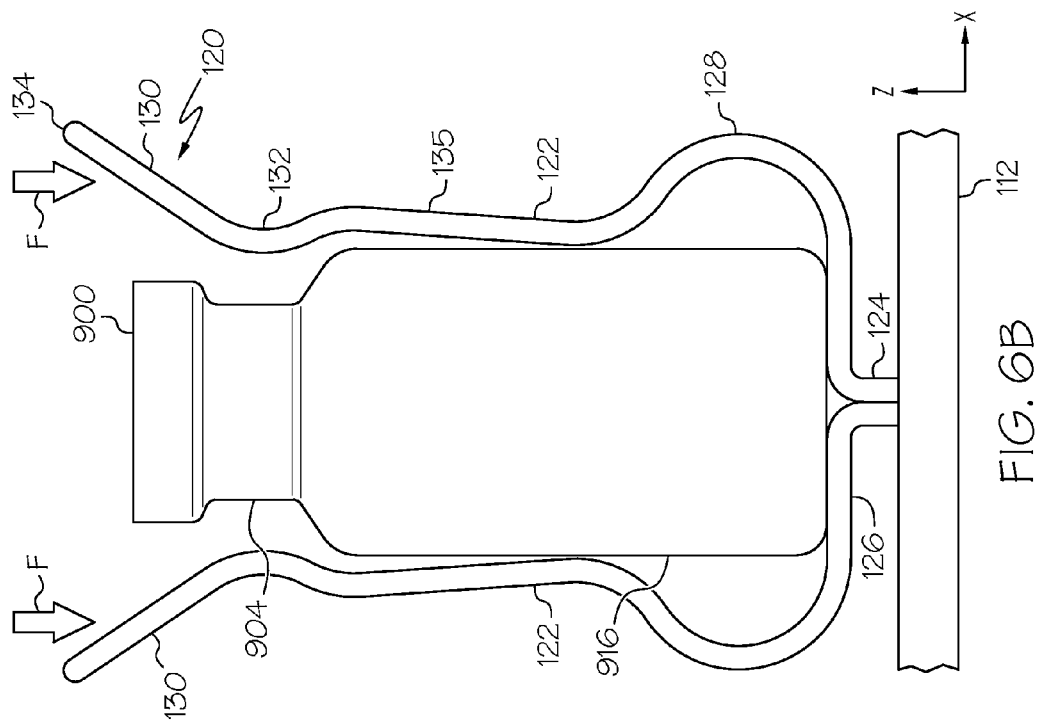
FIG. 6A schematically depicts a perspective side view of a ware keeper in a retaining position, according to one or more embodiments shown and described herein.
Figure 6B:
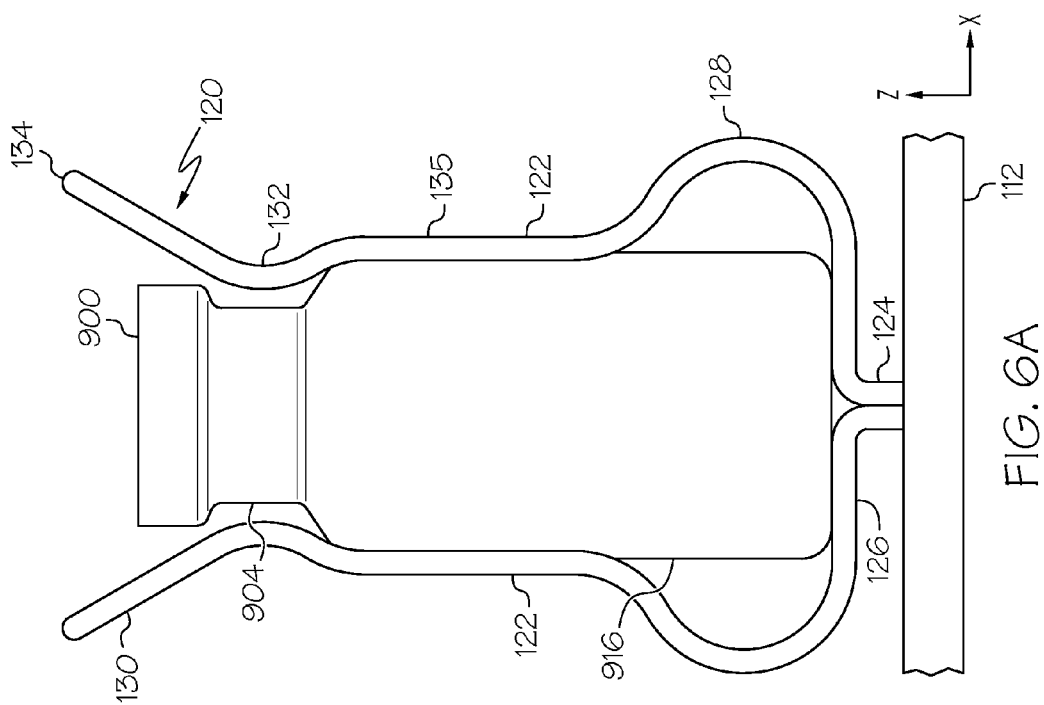
FIG. 6B schematically depicts a perspective side view of a ware keeper in an open position, according to one or more embodiments shown and described herein.

Now referring to FIGS. 6A and 6B, the ware keeper 120 may be transitioned between an open position (shown in FIG. 6B) and a retaining position (shown in FIG. 6A). In the open position, the ware receiving volume 125 is increased and glass articles 900 may be freely moved in and out of the ware keeper 120. In the retaining position, the ware receiving volume 125 is decreased and the glass article 900 is securely held by the ware keeper 120, as described above. For example, when the ware keeper 120 is in a retaining position, the distance between retention segments 132 of opposite retention body 122 is less than the diameter of the body section 902 of the held glass article 900. As such, the glass articles 900 are secured by the ware keepers 120 such that the glass articles 900 are limited in vertical movement. However, when in an open position, the distance between retention segments 132 of opposite retention bodies 122 is greater than the diameter of the body section 902 of the held glass article 900. Therefore, in the open position, the glass articles 900 are not secured relative to upward vertical movement (Z direction).

In one embodiment, the shape of the ware keeper 120 may allow for transition between the open and retaining positions via a downward vertical applied force (depicted by the arrow lettered "F" in FIG. 6B). In such a configuration, the retention bodies 122 may be constructed from a material capable of elastic deformation when a downward force is applied thereto. As such, the ware keeper 120 can move to an open state when a downward force is applied to the retention bodies 122. The ware keeper can naturally move back to the retaining position when the force is released. In another embodiment, the ware keeper 120 may be naturally biased in an open state and may be moved into a retaining state when a force acts upon the ware keeper 120. For example, contact on a ware keeper 120 by a member of a magazine apparatus 100 positioned above the ware keeper may move the hold the ware keeper 120 into a retaining position. For example, in one embodiment, a tool may be used to open one or more of the ware keepers 120. The tool may comprise mechanical latching elements that fasten the tool to the magazine apparatus 100 in precise alignment with the arrays of ware keepers 120. When latched in place, each tool has wedge-like features that contact the lever segment 130 and force the lever segments 130 apart to the point where the retention segments 132 are positioned far enough from one another to allow for clearance of the glass article 900.

In one embodiment, the lever segment 130 of the retention body 122 that is above the retention segment 132 is non-parallel relative to the body segment 135. This "diagonal" shaped lever segment 130 near the top of the ware keeper 120 allows for the downward force F to translate into an opening movement of the retention bodies 122 where the retention segments 132 of the retention bodies 122 move away from one another to allow for the body section 902 of a glass article 900 held in the ware receiving volume 125 to freely pass by the retention segments 132. The elastic deformation may occur at the lower segment 128 of the retention body 122. For example, the shape of the lower segment 128 may allow for elastic deformation that allows for the horizontal movement (in the direction of the Y axis) of the retention segment 132 when a downward force is applied to the connecting segment 134.

Figure 7:
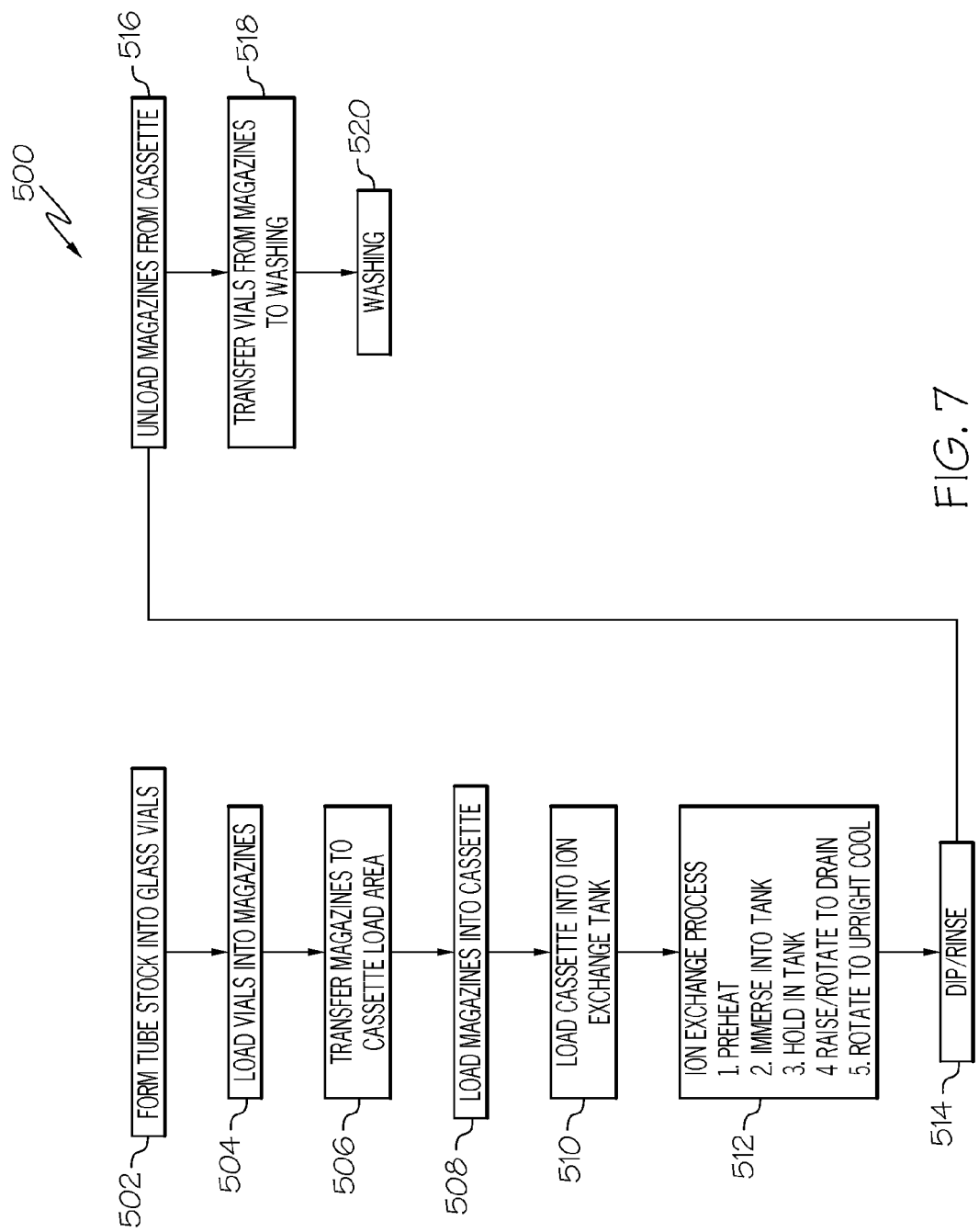
FIG. 7 is a flow diagram of a method for ion-exchange strengthening glass articles with magazine apparatuses, according to one or more embodiments shown and described herein.

Now referring collectively to FIGS. 1, 2, 7, and 8, the glass articles 900 can be strengthened by ion-exchange while being held in the ware keepers 120 of magazine apparatuses 100. FIG. 6 contains a process flow diagram 500 of a method for strengthening glass articles 900 by ion-exchange and FIG. 7 schematically depicts the process described in the flow diagram. In a first step 502, glass tube stock 1000 formed from an ion-exchangeable glass composition is initially shaped into glass articles 900 (specifically glass vials in the embodiment depicted) using conventional shaping and forming techniques. In step 504, the glass articles 900 are loaded into magazine apparatuses 100 using a mechanical magazine loader 602. The magazine loader 602 may be a mechanical gripping device, such as a caliper or the like, which is capable of gripping multiple glass articles 900 at one time. Alternatively, the gripping device may utilize a vacuum system to grip the glass articles 900. The magazine loader 602 may be coupled to a robotic arm or other, similar device capable of positioning the magazine loader 602 with respect to the glass articles 900 and the magazine apparatus 100. The magazine loader 603 positions individual glass articles 900 in the ware receiving volume 125 of each ware keeper 120. The magazine loader 603 may be operable to apply a downward force to move the ware keepers 120 into an open configuration for loading.

In a next step 506, the magazine apparatus 100 loaded with glass articles 900 is transferred with a mechanical conveyor, such as a conveyor belt 606, overhead crane or the like, to a cassette loading area. Thereafter, in step 508, a plurality of magazine apparatuses 100 (one depicted) are loaded into a cassette 608. While only one magazine apparatus 100 is depicted in FIG. 12, it should be understood that the cassette 608 is constructed to hold a plurality of magazine apparatuses 100 such that a large number of glass articles 900 can be processed simultaneously. Each magazine apparatus 100 is positioned in the cassette 608 utilizing a cassette loader 610. The cassette loader 610 may be a mechanical gripping device, such as a caliper or the like, which is capable of gripping one or more magazine apparatuses 100 at a time. Alternatively, the gripping device may utilize a vacuum system to grip the magazine apparatuses 100. The cassette loader 610 may be coupled to a robotic arm or other, similar device capable of positioning the cassette loader 610 with respect to the cassette 608 and the magazine apparatuses 100.

In a next step 510, the cassette 608 containing the magazine apparatuses 100 and glass articles 900 is transferred to an ion-exchange station and loaded into an ion-exchange tank 614 to facilitate chemically strengthening the glass articles 900. The cassette 608 is transferred to the ion-exchange station with a cassette transfer device 612. The cassette transfer device 612 may be a mechanical gripping device, such as a caliper or the like, which is capable of gripping the cassette 608. Alternatively, the gripping device may utilize a vacuum system to grip the cassette 608. The cassette transfer device 612 and attached cassette 608 may be automatically conveyed from the cassette loading area to the ion-exchange station with an overhead rail system, such as a gantry crane or the like. Alternatively, the cassette transfer device 612 and attached cassette 608 may be conveyed from the cassette loading area to the ion-exchange station with a robotic arm. In yet another embodiment, the cassette transfer device 612 and attached cassette 608 may be conveyed from the cassette loading area to the ion-exchange station with a conveyor and, thereafter, transferred from the conveyor to the ion-exchange tank 614 with a robotic arm or an overhead crane.

Once the cassette transfer device 612 and attached cassette 608 are at the ion-exchange station, the cassette 608 and the glass articles 900 contained therein may optionally be preheated prior to submerging the cassette 608 and the glass articles 900 in the ion-exchange tank 614. In some embodiments, the cassette 608 may be preheated to a temperature greater than room temperature and less than or equal to the temperature of the molten salt bath in the ion-exchange tank 614. For example, the glass articles 900 may be preheated to a temperature from about 300° C.-500° C. However, it should be understood that the preheating step is optional due to the relatively low thermal mass of the magazine apparatuses 100 described herein.

The ion-exchange tank 614 contains a bath of molten salt 616, such as a molten alkali salt, such as $KNO_3$, $NaNO_3$ and/or combinations thereof. In one embodiment, the bath of molten salt is 100% molten $KNO_3$ which is maintained at a temperature greater than or equal to about 350° C. and less than or equal to about 500° C. However, it should be understood that baths of molten alkali salt having various other compositions and/or temperatures may also be used to facilitate ion-exchange of the glass articles.

In step 512, the glass articles 900 are ion-exchange strengthened in the ion-exchange tank 614. Specifically, the glass articles are submerged in the molten salt and held there for a period of time sufficient to achieve the desired compressive stress and depth of layer in the glass articles 900. As the glass articles 900 are submerged, the glass articles initially have positive buoyancy as air escapes from the interior volume of the glass articles and is replaced with molten salt. As the glass articles 900 rise due to the positive buoyancy, the glass articles are vertically retained in position by the retention segments 132 of the ware keepers 120 while in a retaining position. In addition the basket-like open structure of the ware keepers 120 allows the molten salt bath to contact all surfaces of the glass articles, improving the uniformity of the compressive stress induced in the surface of the glass articles.

In one embodiment, the glass articles 900 may be held in the ion-exchange tank 614 for a time period sufficient to achieve a depth of layer of up to about 100 μm with a compressive stress of at least about 300 MPa or even 350 MPa. The holding period may be less than 30 hours or even less than 20 hours. However it should be understood that the time period with which the glass articles are held in the tank 614 may vary depending on the composition of the glass container, the composition of the bath of molten salt 616, the temperature of the bath of molten salt 616, and the desired depth of layer and the desired compressive stress.

After the glass articles 900 are ion-exchange strengthened, the cassette 608 and glass articles 900 are removed from the ion-exchange tank 614 using the cassette transfer device 612 in conjunction with a robotic arm or overhead crane. During removal from the ion-exchange tank 614, the basket-like open structure of the ware keepers 120 of the magazine apparatus 100 allows the molten salt within the magazine apparatus to readily drain from each magazine apparatus. After the cassette 608 is removed from the ion-exchange tank 614, the cassette 608 and the glass articles 900 are suspended over the ion-exchange tank 614 and the cassette 608 is rotated about a horizontal axis such that any molten salt remaining in the glass articles 900 is emptied back into the ion-exchange tank 614. As the cassette 608 is rotated, the glass articles 900 are maintained in its position in the ware receiving volume 125 by the ware keepers 120. Thereafter, the cassette 608 is rotated back to its initial position and the glass articles are allowed to cool prior to being rinsed.

The cassette 608 and glass articles 900 are then transferred to a rinse station with the cassette transfer device 612. This transfer may be performed with a robotic arm or overhead crane, as described above, or alternatively, with an automatic conveyor such as a conveyor belt or the like. In a next step 514, the cassette 608 and glass articles 900 are lowered into a rinse tank 618 containing a water bath 620 to remove any excess salt from the surfaces of the glass articles 900. The cassette 608 and glass articles 900 may be lowered into the rinse tank 618 with a robotic arm, overhead crane or similar device which couples to the cassette transfer device 612. Similar to the salt bath submersion, the glass articles initially have a positive buoyancy upon being submerged in the rinse tank 618. As the glass articles 900 rise due to the positive buoyancy, the glass articles are vertically retained in position by the retention segments 132 of the ware keepers 120 while in a retaining position.

The cassette 608 and glass articles 900 are then withdrawn from the rinse tank 618, suspended over the rinse tank 618, and the cassette 608 is rotated about a horizontal axis such that any rinse water remaining in the glass articles 900 is emptied back into the rinse tank 618. As the cassette 608 is rotated, the glass articles 900 are maintained in their position in the ware receiving volume 125 by the ware keepers 120. In some embodiments, the rinsing operation may be performed multiple times before the cassette 608 and glass articles 900 are moved to the next processing station.

In one particular embodiment, the cassette 608 and the glass articles 900 are dipped in a water bath at least twice. For example, the cassette 608 may be dipped in a first water bath and, subsequently, a second, different water bath to ensure that all residual alkali salts are removed from the surface of the glass article. The water from the first water bath may be sent to waste water treatment or to an evaporator.

In a next step 516, the magazine apparatuses 100 are removed from the cassette 608 with the cassette loader 610. Thereafter, in step 518, the glass articles 900 are unloaded from the magazine apparatuses 100 with the magazine loader 602 and transferred to a washing station. The magazine loader 602 may be utilized to transition the ware keepers 120 to an open state. In step 520, the glass articles are washed with a jet of de-ionized water 624 emitted from a nozzle 622. The jet of de-ionized water 624 may be mixed with compressed air.

Optionally, in step 521 (not depicted in FIG. 8), the glass articles 900 are transferred to an inspection station where the glass articles are inspected for flaws, debris, discoloration and the like.

While the magazine apparatuses have been shown and described herein being used in conjunction with glass containers, such as glass vials, it should be understood that the magazine apparatuses may be used to hold and retain various other types of glass articles including, without limitation, Vacutainers®, cartridges, syringes, ampoules, bottles, flasks, phials, tubes, beakers, vials or the like, including both round-form glass articles and non-round-form glass articles.

It should now be understood that the magazine apparatuses described herein may be used to hold and retain glass articles during processing. Forming the ware keepers of the magazine apparatus from wire segments mitigates the introduction of flaws in the glass articles retained within the magazine apparatus and securely holds the glass articles through all stages of processing. Ware keepers formed in this manner also reduce the thermal mass and surface area of the magazine apparatus which improves ion-exchange performance when the magazine apparatuses are used to facilitate strengthening of the glass articles contained therein by ion-exchange.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. An apparatus for holding and retaining glass articles during processing, the apparatus comprising:
   a base frame comprising a bottom support plate;
   a plurality of ware keepers positioned on the bottom support plate, wherein each ware keeper of the plurality of ware keepers comprises a plurality of retention bodies formed from wire segments and defining a ware receiving volume therebetween, wherein each retention body comprises:
   a base connection stem engaged with the bottom support plate;
   a seat segment contiguous with the base connection stem and positioned over and substantially parallel to the bottom support plate;
   a lower segment coupled to the seat segment;
   a body segment coupled to the lower segment and extending away from the bottom support plate, the lower segment positioned between the seat segment and the body segment;

a retention segment coupled to the body segment, wherein a diameter of the ware receiving volume enclosed by the retention segment is less than a diameter of the ware receiving volume enclosed by the body segment; and a lever segment coupled to the retention segment, wherein the seat segments of the retention bodies form a ware seat positioned above and substantially parallel to the bottom support plate, the ware seat defining a bottom of the ware receiving volume and configured to support a glass article thereon such that a bottom of the glass article rests directly on the ware seat.

2. The apparatus of claim 1, wherein the lever segments of opposing retention bodies extend away from one another.

3. The apparatus of claim 1, wherein a diameter of the ware receiving volume enclosed by the lower segment is greater than the diameter of the ware receiving volume enclosed by the body segment.

4. The apparatus of claim 1, wherein the seat segment of each retention body is spaced apart from the bottom support plate.

5. The apparatus of claim 1, wherein each retention body is attached to an adjacent retention body with a connecting segment to form retention body couplets.

6. The apparatus of claim 5, wherein the connecting segment is a looped wire segment.

7. The apparatus of claim 1, wherein each ware keeper comprises four retention bodies.

8. The apparatus of claim 7, wherein each of the four retention bodies are attached to another retention body, such that each ware keeper comprises two retention body couplets.

9. The apparatus of claim 8, wherein the two retention body couplets are linearly symmetric with one another.

10. The apparatus of claim 8, wherein the retention body couplets are positioned on opposite sides of the ware receiving volume.

11. The apparatus of claim 1, wherein the ware keeper moves to an open position when a downward force is applied to the retention bodies.

12. An assembly for holding and retaining glass articles, the assembly comprising a plurality of magazine apparatuses, each of the magazine apparatuses comprising:

a base frame comprising a bottom support plate;

a plurality of ware keepers positioned on the bottom support plate, wherein each ware keeper of the plurality of ware keepers comprises a plurality of retention bodies formed from wire segments and defining a ware receiving volume therebetween, wherein each retention body comprises:

a base connection stem engaged with the bottom support plate;

a seat segment contiguous with the base connection stem and positioned over and substantially parallel to the bottom support plate, wherein the seat segment of each retention body is spaced apart from the bottom support plate;

a lower segment coupled to the seat segment;

a body segment coupled to the lower segment and extending away from the bottom support plate, the lower segment positioned between the seat segment and the body segment;

a retention segment coupled to the body segment; and a lever segment coupled to the retention segment, wherein the seat segments of the retention bodies form a ware seat positioned above and substantially parallel to the bottom support plate, the ware seat defining a bottom of the ware receiving volume and configured to support a glass article thereon such that a bottom section of the glass article rests directly on the ware seat.

13. The assembly of claim 12, wherein the lever segments of opposing retention bodies extend away from one another.

14. The assembly of claim 12, wherein a diameter of the ware receiving volume enclosed by the retention segment is less than a diameter of the ware receiving volume enclosed by the body segment.

15. The assembly of claim 12, wherein a diameter of the ware receiving volume enclosed by the lower segment is greater than the diameter of the ware receiving volume enclosed by the body segment.

16. The assembly of claim 12, wherein each retention body is attached to an adjacent retention body with a connecting segment to form retention body couplets.

17. The assembly of claim 12, wherein each ware keeper comprises four retention bodies.

18. An apparatus for holding and retaining glass articles during processing, the apparatus comprising:

a base frame comprising a bottom support plate;

a plurality of ware keepers positioned on the bottom support plate, wherein each ware keeper of the plurality of ware keepers comprises a plurality of retention bodies formed from wire segments and defining a ware receiving volume therebetween, wherein each retention body comprises:

a base connection stem engaged with the bottom support plate;

a seat segment contiguous with the base connection stem and positioned over and substantially parallel to the bottom support plate;

a lower segment coupled to the seat segment;

a body segment coupled to the lower segment and extending away from the bottom support plate, the lower segment positioned between the seat segment and the body segment, wherein a diameter of the ware receiving volume enclosed by the lower segment is greater than the diameter of the ware receiving volume enclosed by the body segment;

a retention segment coupled to the body segment; and a lever segment coupled to the retention segment, wherein the seat segments of the retention bodies form a ware seat positioned above and substantially parallel to the bottom support plate, the ware seat defining a bottom of the ware receiving volume and configured to support a glass article thereon such that a bottom of the glass article rests directly on the ware seat.

19. An apparatus for holding and retaining glass articles during processing, the apparatus comprising:

a base frame comprising a bottom support plate;

a plurality of ware keepers positioned on the bottom support plate, wherein each ware keeper of the plurality of ware keepers comprises a plurality of retention bodies formed from wire segments and defining a ware receiving volume therebetween, wherein each retention body comprises:

a base connection stem engaged with the bottom support plate;

a seat segment contiguous with the base connection stem and positioned over and substantially parallel to the bottom support plate, wherein the seat segment of each retention body is spaced apart from the bottom support plate;

a lower segment coupled to the seat segment;

a body segment coupled to the lower segment and extending away from the bottom support plate, the lower segment positioned between the seat segment and the body segment;

a retention segment coupled to the body segment; and a lever segment coupled to the retention segment, wherein the seat segments of the retention bodies form a ware seat positioned above and substantially parallel to the bottom support plate, the ware seat defining a bottom of the ware receiving volume and configured to support a glass article thereon such that a bottom of the glass article rests directly on the ware seat.

20. An apparatus for holding and retaining glass articles during processing, the apparatus comprising:

a base frame comprising a bottom support plate;

a plurality of ware keepers positioned on the bottom support plate, wherein each ware keeper of the plurality of ware keepers comprises a plurality of retention bodies formed from wire segments and defining a ware receiving volume therebetween, wherein each retention body comprises:

a base connection stem engaged with the bottom support plate;

a seat segment contiguous with the base connection stem and positioned over and substantially parallel to the bottom support plate;

a lower segment coupled to the seat segment;

a body segment coupled to the lower segment and extending away from the bottom support plate, the lower segment positioned between the seat segment and the body segment;

a retention segment coupled to the body segment; and a lever segment coupled to the retention segment, wherein each retention body is attached to an adjacent retention body with a connecting segment to form retention body couplets and the seat segments of the retention bodies form a ware seat positioned above and substantially parallel to the bottom support plate, the ware seat defining a bottom of the ware receiving volume and configured to support a glass article thereon such that a bottom of the glass article rests directly on the ware seat.

* * * * *